(12) United States Patent
Kim et al.

(10) Patent No.: US 8,621,087 B2
(45) Date of Patent: Dec. 31, 2013

(54) METHOD FOR CONFIGURING CLOSED USER NETWORK USING IP TUNNELING MECHANISM AND CLOSED USER NETWORK SYSTEM

(75) Inventors: Sun-Cheul Kim, Daejeon (KR);
Ho-Yong Ryu, Daejeon (KR);
Sung-Back Hong, Daejeon (KR);
Kyeong-Ho Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 232 days.

(21) Appl. No.: 13/133,540

(22) PCT Filed: Dec. 8, 2009

(86) PCT No.: PCT/KR2009/007315
§ 371 (c)(1),
(2), (4) Date: Jun. 8, 2011

(87) PCT Pub. No.: WO2010/068018
PCT Pub. Date: Jun. 17, 2010

(65) Prior Publication Data
US 2011/0270996 A1    Nov. 3, 2011

(30) Foreign Application Priority Data

Dec. 8, 2008 (KR) .......................... 10-2008-0124010
Jul. 16, 2009 (KR) .......................... 10-2009-0064814

(51) Int. Cl.
*G06F 15/16* (2006.01)
(52) U.S. Cl.
USPC ............ 709/227; 709/218; 709/219; 709/249
(58) Field of Classification Search
None
See application file for complete search history.

(56) References Cited

U.S. PATENT DOCUMENTS

| | | | |
|---|---|---|---|
| 6,041,166 A * | 3/2000 | Hart et al. ...................... | 709/238 |
| 6,496,867 B1 * | 12/2002 | Beser et al. ................... | 709/245 |
| 2004/0013130 A1 * | 1/2004 | Blanchet et al. .............. | 370/466 |

(Continued)

FOREIGN PATENT DOCUMENTS

| | | |
|---|---|---|
| JP | 2007-502574 | 2/2007 |
| KR | 1020080050973 | 6/2008 |
| WO | 2004/023838 A2 | 3/2004 |
| WO | 2005/043817 A1 | 5/2005 |

OTHER PUBLICATIONS

International Search Report for Application No. PCT/KR2009/007315, dated Jun. 1, 2010.

*Primary Examiner* — John B. Walsh
(74) *Attorney, Agent, or Firm* — Nelson Mullins Riley & Scarborough LLP

(57) ABSTRACT

A method for configuring a closed user network (CUN) using an IP tunneling mechanism and a CUN system are disclosed. In particular, disclosed is a technique of establishing a tunnel between a tunnel end edge device (TEED) and a control server by using an IP tunneling mechanism to allow terminals connected to the TEED to perform communications by using a closed IP, enabling the TEED to provide a network address translation (NAT) function so that the TEED can perform data forwarding like a general NAT, without performing tunneling on a destination IP outside the closed IP section, to perform communication, and allowing a terminal located in an area where the TEED is not provided to directly establish a tunnel with the control server by using a client software to thereby perform communications with a terminal or a server connected to the TEED by using the closed IP.

14 Claims, 12 Drawing Sheets

(56) References Cited

U.S. PATENT DOCUMENTS

| | | |
|---|---|---|
| 2006/0023644 A1* | 2/2006 | Jang et al. .................. 370/261 |
| 2006/0026160 A1 | 2/2006 | Duroj |
| 2006/0215684 A1* | 9/2006 | Capone .................. 370/437 |
| 2008/0281949 A1* | 11/2008 | Aborn .................. 709/222 |
| 2010/0008260 A1 | 1/2010 | Kim et al. |

* cited by examiner

METHOD FOR CONFIGURING CLOSED USER NETWORK USING IP TUNNELING MECHANISM AND CLOSED USER NETWORK SYSTEM

RELATED APPLICATIONS

This application is a 35 U.S.C. §371 national stage filing of PCT Application No. PCT/KR2009/007315 filed on Dec. 8, 2009, which claims priority to, and the benefit of, Korean Patent Application No. 10-2008-0124010 filed on Dec. 8, 2008 and Korean Patent Application No. 10-2009-0064814 filed on Jul. 16, 2009. The contents of the aforementioned applications are hereby incorporated by reference.

TECHNICAL FIELD

The present invention relates to a method for configuring a Closed User Network (CUN) using an IP tunneling mechanism and a CUN system and, more particularly, to a technique of establishing a tunnel between a tunnel end edge device (TEED) and a control server by using an IP tunneling mechanism to allow terminals connected to the TEED to perform communications by using a closed IP, enabling the TEED to provide a network address translation (NAT) function so that the TEED can perform data forwarding like a general NAT, without performing tunneling on a destination IP outside the closed IP section, to perform communications, and allowing a terminal located in an area where the TEED is not provided to directly establish a tunnel with the control server by using client software to thereby perform communications with a terminal or a server connected to the TEED by using the closed IP.

BACKGROUND ART

FIG. 1 illustrates related art type Internet access by user terminals, in which the type of Internet access by user terminals may be classified into a wired type and a wireless type, and the wireless type may be classified into WiFi, WiBro, and HSDPA.

According to Internet access type, a private IP requiring a network address translation (NAT) is used, or a public IP without the necessity of NAT is used. In particular, a current IPv4-based network is short of IP addresses, making many users access the Internet by using a private IP requiring the NAT.

An analysis of the communication availability between terminals according to each Internet access type reveals a restriction in direct communications between terminals in the case of using the private IP, as noted in Table 1 shown below. In Table 1, "○" indicates the availability or possibility of communications, "x" indicates the unavailability of communications, while "▲" indicates the availability of communications according to circumstances.

TABLE 1

|  |  | Ethernet | | WiFi | | WiBro | HSDPA | Server farm |
|---|---|---|---|---|---|---|---|---|
|  |  | Public | Private | Public | Private | Public | Private | Public |
| Ethernet | Public | ○ | ▲ | ○ | ▲ | ○ | ▲ | ○ |
|  | Private | ▲ | x | ▲ | x | ▲ | x | ○ |
| WiFi | Public | ○ | ▲ | ○ | ▲ | ○ | ▲ | ○ |
|  | Private | ▲ | x | ▲ | x | ▲ | x | ○ |
| WiBro | Public | ○ | ▲ | ○ | ▲ | ○ | ▲ | ○ |
| HSDPA | Private | ▲ | x | ▲ | x | ▲ | x | ○ |
| Server farm | Public | ○ | ○ | ○ | ○ | ○ | ○ | ○ |

In detail, as shown in Table 1, it is impossible for terminals using the private IP to perform communication. If a single terminal uses a public ID, it is only when a terminal using the private ID first transmits a UDP or TCP message to the terminal using the public IP that the two terminals can directly communicate with each other. Terminals using the public IP can communicate, but nonetheless, if a firewall exists, they cannot communicate directly.

That is, the NAT or the firewall hinders direct communications between terminals.

Thus, currently, programs such as games or Internet messenger programs using P2P communications must have a STUN (Simple Traversal of User Datagram Protocol [UDP] Through Network Address Translators [NATs]) or TURN (Traversal Using Relay NAT) function to provide services.

Meanwhile, when most organizations or institutions build an Intranet, a firewall is basically used to interrupt the Intranet being accessed from an external network. Firewalls employing packet filtering are high-priced, so it may be highly burdensome for a small organization, having built an Intranet, to then install a firewall.

In addition, an IPv6 technique is being distributed to solve the shortage of IP addresses; however, this is not the main course of action. Namely, a substantial network-based IPv6 function is very rarely installed in a field and operated, causing a problem in that there are few IPv6 application programs.

DISCLOSURE OF INVENTION

Technical Problem

An aspect of the present invention provides a method for configuring a Closed User Network (CUN) using an IP tunneling mechanism and a CUN system capable of establishing a tunnel between a tunnel end edge device (TEED) and a control server by using an IP tunneling mechanism to allow terminals connected to the TEED to perform communications by using a closed IP, enabling the TEED to provide a network address translation (NAT) function so that the TEED can perform data forwarding like a general NAT, without performing tunneling on a destination IP outside the closed IP section, to perform communication, and allowing a terminal located in an area where the TEED is not provided to directly establish a tunnel with the control server by using a client software to thereby perform communications with a terminal or a server connected to the TEED by using the closed IP.

Solution to Problem

According to an aspect of the present invention, there is provided a method for configuring a Closed User Network (CUN) including: establishing a control tunnel between a TEED and a control server; allocating, by the TEED, a closed IP to a terminal that is connected to the TEED within a closed IP section allocated from the control server; and determining, by the TEED, whether to forward a packet which has been received from the terminal to the CUN or to a general network.

The method for configuring a CUN may further include: transmitting, by the TEED, a registration request message to the control server; and receiving, by the TEED, the closed IP section as allocated from the control server, before the control tunnel is established. The method for configuring a CUN may further include: receiving, by the TEED, closed IP section information of all the CUNs managed by the control server from the control server. In this case, the determining of whether to forward the packet which has been received from the terminal, by the TEED, to the CUN or to the general network may be made based on the closed IP section information of all the CUNs.

The establishing of the control tunnel may include: establishing, by the control server, the control tunnel according to a tunnel request message received from the TEED and connecting the closed IP section information, which has been allocated to the TEED, to the established control tunnel; and establishing, by the TEED, the control tunnel according to a tunnel response message which has been received from the control server, and connecting the closed IP section information of all the CUNs to the established control tunnel.

The establishing of the control tunnel may include: establishing, by the control server, the control tunnel, by reflecting changed source IP address and UDP port information of a tunnel request message received from the TEED and connecting the closed IP section information, which has been allocated to the TEED, to the established control tunnel; and establishing, by the TEED, the control tunnel according to the tunnel response message received from the control server, and connecting the closed IP section information of all the CUNs to the established control tunnel.

The method for configuring a CUN may further include: establishing a direct tunnel between the TEED and a second TEED previously registered to the control server, wherein the establishing of the direct tunnel may include: determining whether or not direct communications between the TEED and the second TEED are available by checking a network access type of the TEED and that of the second TEED according to a STUN (Simple Traversal of User Datagram Protocol [UDP] Through Network Address Translators [NATs]) method; if direct communications is available, acquiring, by the TEED, an IP address and a port number to be used for communications with the second TEED; exchanging a tunnel request message and a tunnel response message between the TEED and the second TEED; and setting tunnel information and route information in the TEED and the second TEED.

The method for configuring a CUN may further include: establishing a direct tunnel between the TEED and a user terminal which has not been connected to the TEED, wherein the establishing of the direct tunnel may include: determining whether or not direct communications between the TEED and the user terminal are available by checking a TEED network access type and that of the user terminal according to a STUN method; if direct communications are available, acquiring, by the user terminal, an IP address and a port number to be used for communications with the TEED; exchanging a tunnel request message and a tunnel response message between the TEED and the user terminal; and setting tunnel information and route information in the TEED and the user terminal.

According to another aspect of the present invention, there is provided a CUN system including: a control server configured to establish a control tunnel with a tunnel endpoint edge device (TEED) and forward a packet transmitted and received to and from the TEED by using closed IP section information which has been allocated to the TEED; and the TEED configured to establish the control tunnel with the control server and allocate a closed IP to a terminal connected to the TEED, within a closed IP section allocated from the control server.

The TEED may have a network address translation (NAT) function, and perform tunneling on a packet within the allocated closed IP section, and may not perform tunneling on a packet outside the allocated closed IP section but forward the packet through the NAT function.

The CUN system may further include: a user terminal equipped with client software for performing tunneling with the control server and not being connected with the TEED, wherein the user terminal may establish a control tunnel with the control server by executing the client software, and may be allocated a closed IP from the control server to communicate with terminals connected with the TEED. In addition, the user terminal may establish a direct tunnel with the TEED and perform communications with the terminals connected with the TEED through the direct tunnel.

Advantageous Effects of Invention

According to exemplary embodiments of the present invention, because communications are performed by using a closed IP, network access is only open between closed users, and those accessing the closed network from an external network can be fundamentally interrupted, so a network for a particular purpose can be effectively configured for only limited users.

In addition, because conventional Internet access is available, various Internet services such as Web services or Instant Messenger Programs available in the general network, as well as the network of the limited users, can be used.

Also, because the TEED provides the NAT function, respective terminals are recognized as they are connected to a public network in spite of using the closed IP, and accordingly, direct communications are available between terminals or servers using a private IP and P2P communications are available between terminals using a closed IP without considering an issue such as a NAT or firewall.

In addition, because IPv6 as well as IPv4 can be used as the closed IP employed in the exemplary embodiment of the present invention, construction of CUN based on IPv6 would lead to the creation of a greater range of IPv6 application programs.

Moreover, an organization intending to establish a closed network having a particular purpose such as serving an army or police force, an institution or agency intending to establish a closed Intranet, an organization intending to perform intergroup closed direct communications by associating small groups such as small office/home office (SOHO) which are separately located, or a home intending to construct a home network available for closed direct communications can effectively configure a network by using the present invention.

BEST MODE FOR CARRYING OUT THE INVENTION

Figure 1:
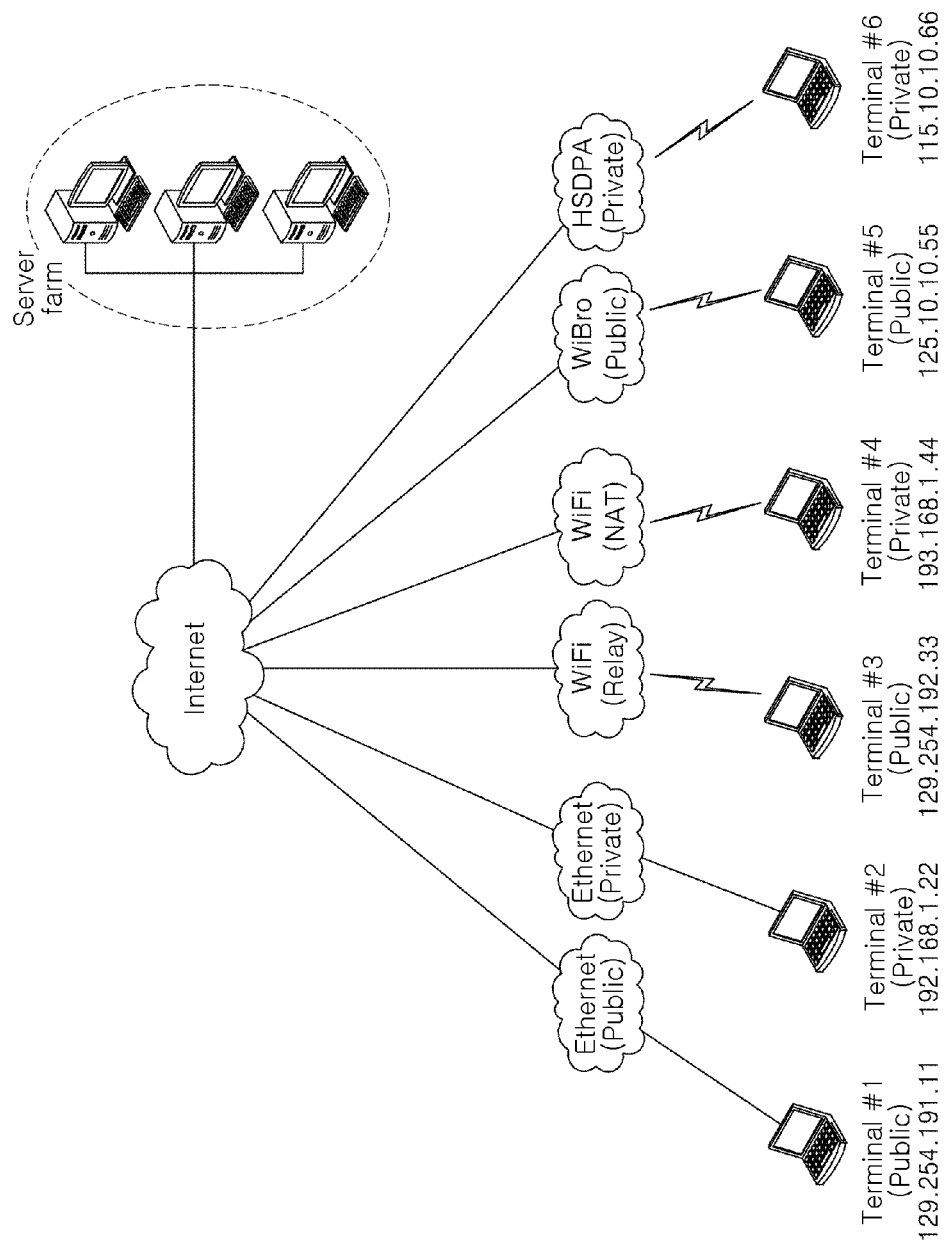
FIG. 1 illustrates the related art Internet access type of user terminals.

Exemplary embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In describing the present invention, if a detailed explanation for a related known function or construction is considered to unnecessarily divert the gist of the present invention, such explanation will be omitted but would be understood by those skilled in the art. The same reference numerals will be used throughout to designate the same or like components.

It will be understood that when an element is referred to as "being connected" with another element, it can be directly connected with the other element or intervening elements may also be present. Unless explicitly described to the contrary, the word "comprise" and variations such as "comprises" or "comprising," will be understood to imply the inclusion of stated elements but not the exclusion of any other elements.

In an exemplary embodiment of the present invention, IPv6 as well as IPv4 can be used as a closed IP. When IPv4 is used as the closed IP, an IPv4 over UDP over IPv4 tunneling method is employed, while when IPv6 is used as the closed IP, an IPv6 over UDP over IPv4 tunneling method is employed. In the following description, the case of using the IPv4 over UDP over IPv4 tunneling method will be described for the sake of brevity, but the present invention is not meant to be limited thereto.

Figure 2:
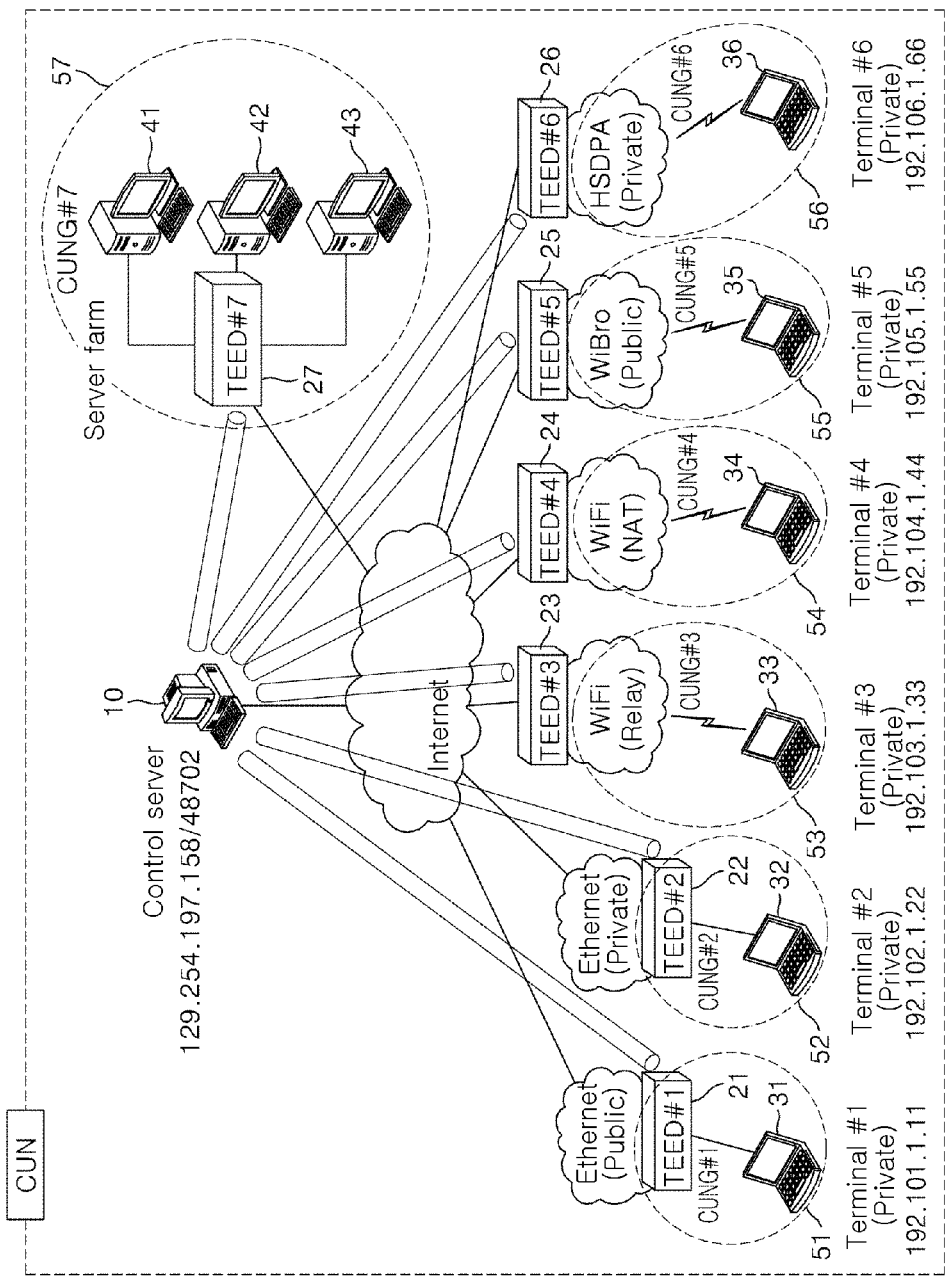
FIG. 2 illustrates the configuration of a Closed User Network (CUN) according to an exemplary embodiment of the present invention.

FIG. 2 illustrates the configuration of a Closed User Network (CUN) according to an exemplary embodiment of the present invention, in which the CUN includes a control server 10, tunnel endpoint edge devices (TEEDs) 21 to 27, and terminals 31 to 36.

In the present exemplary embodiment, tunnels are established at least between the control server 10 and the TEEDs 21 to 27, between the control server 10 and the terminals 31 to 36, between the TEEDs 21 to 27, and between the TEEDs 21 to 27 and the terminals 31 to 36, to establish a network environment in which the terminal can directly perform communications by using a closed IP. In addition, because each of the terminals 31 to 36 use the closed IP, namely, a private IP, through tunneling, accessing by a general Internet terminal located outside the CUN is not possible.

The control server 10 located in the network establishes a tunnel with the terminals 31 to 36 or the TEEDs 21 to 27 and serves to forward a packet transmitted or received to or from the terminals 31 to 36 or the TEEDs 21 to 27.

In detail, the control server 10 establishes a tunnel with the TEEDs 21 to 27 according to a request from the corresponding TEEDs 21 to 27. According to circumstances, the control server 10 may directly establish a tunnel with the terminals 31 to 36. In addition, the control server 10 may allocate a closed IP section to each of the TEEDs 21 to 27, and forward a packet transmitted or received between the TEEDs 21 to 27 by reflecting the allocated closed IP section information on a route table.

The TEEDs 21 to 27, which are located in the same manner as the existing wired NAT device or a wireless NAT device, are edge devices having an NAT function allowing the terminals 31 to 36 to perform communications by using a private IP, and being available for tunneling with the control server 10. Also, the TEEDs 21 to 27 may allocate a closed IP to each of the terminals 31 to 36 within the closed IP section allocated from the control server 10.

The TEEDs 21 to 27 forward a packet, which has been received from the terminals 31 to 36, in the form of a tunneled packet to the control server 10, and forward the tunneled packet received from the control server 10, in the form of a pure closed IP packet to the terminals 31 to 36.

A NAT or firewall may exist between the TEEDs 21 to 27 and the control server 10. In this case, the TEEDs 21 to 27 and the control server 10 has a NAT traversal function in the process of establishing the tunnels by the TEEDs 21 to 27 and the control server 10.

The TEEDs 21 to 27 generate sub-networks called CUN groups (CUNGs) 51 to 57, respectively. Thus, the number of CUNGs is consistent with the number of the TEEDs. In the present exemplary embodiment, a network configured by the CUNGs 51 to 57 generated by the plurality of TEEDs 21 to 27 in association with the control server 10 is called the CUN, and in this case, the terminal which has established a direct tunnel with the control server 10 may be an element of the CUN.

Each of the terminals 31 to 36 is a terminal device that can be allocated a closed IP from the TEEDs 21 to 27 to communicate with another terminal located in a closed IP area without using any client software. For example, the terminal includes a desktop computer, a notebook computer, a personal digital assistant (PDA), and the like. In addition, the terminals 31 to 36 may use the existing Internet. This is because, the TEEDs 21 to 27 perform an operation in the same manner as the existing NAT without performing tunneling on packets outside the closed IP section allocated from the control server 10.

As shown in FIG. 2, a server farm can be configured as a closed network by using the TEED#7 27 without using high-priced equipment such as a firewall. In this case, an external Internet user is fundamentally prevented from accessing respective servers 41 to 43 of the server farm.

Currently, WiBro allocates a public IP to the terminals but uses a firewall, and HSDPA allocates a private IP to the terminals making it difficult to perform direct communications with an Internet user located outside of the CUN. However, configuration of the CUN by using the TEED allows for direct communications between users each having a different access form (e.g., Ethernet, Wi-Fi, HSDPA, etc.).

Figure 3:
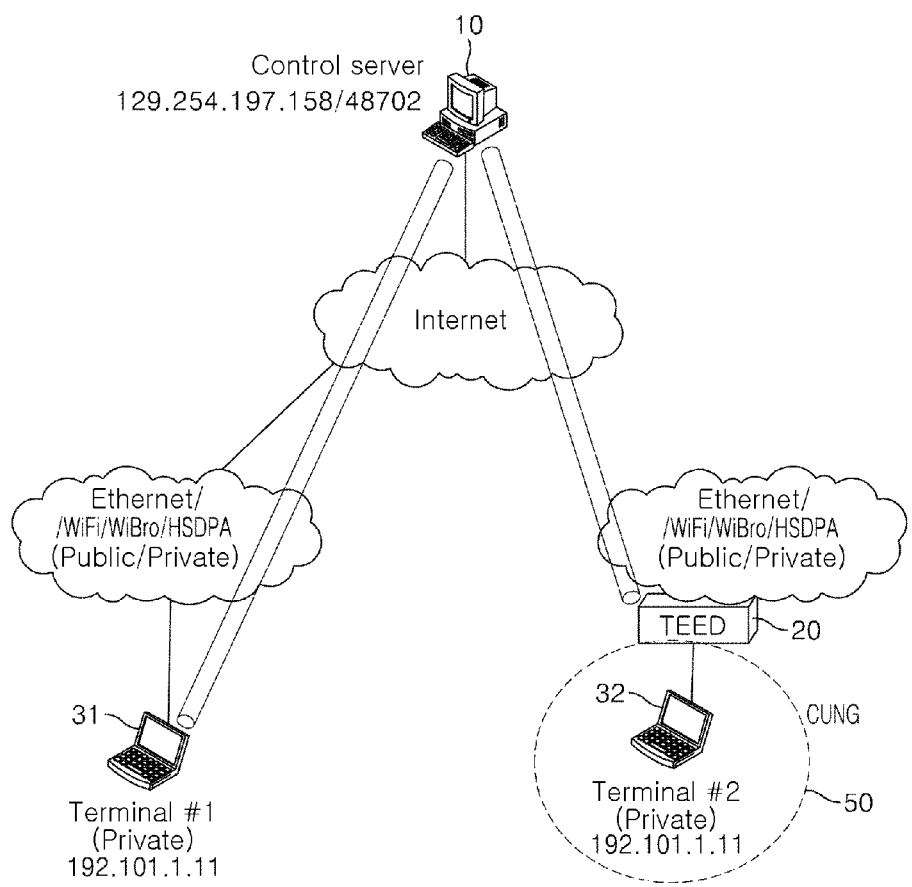
FIG. 3 illustrates a tunnel structure for communications between a terminal connected with a tunnel end edge device (TEED) of a CUN and a terminal located outside the CUN.

FIG. 3 illustrates a tunnel structure for communications between a terminal connected with the TEED of the CUN and a terminal located outside the CUN.

If the terminal #1 31, which has performed communications in the CUN, moves to a different location so that it is connected with the general Internet without the TEED, because the CUN has the structure to fundamentally prevent network access from outside the CUN based on the closed IP, the terminal #1 31 cannot access the user network. In this case, however, the terminal #1 31, equipped with a client performing tunneling with the control server 10, can execute the client in order to establish a direct tunnel with the control server 10, and be allocated a closed IP to access the CUN, whereby the terminal #1 31 can perform communications with a particular server or terminal located in the CUN.

Figure 4:
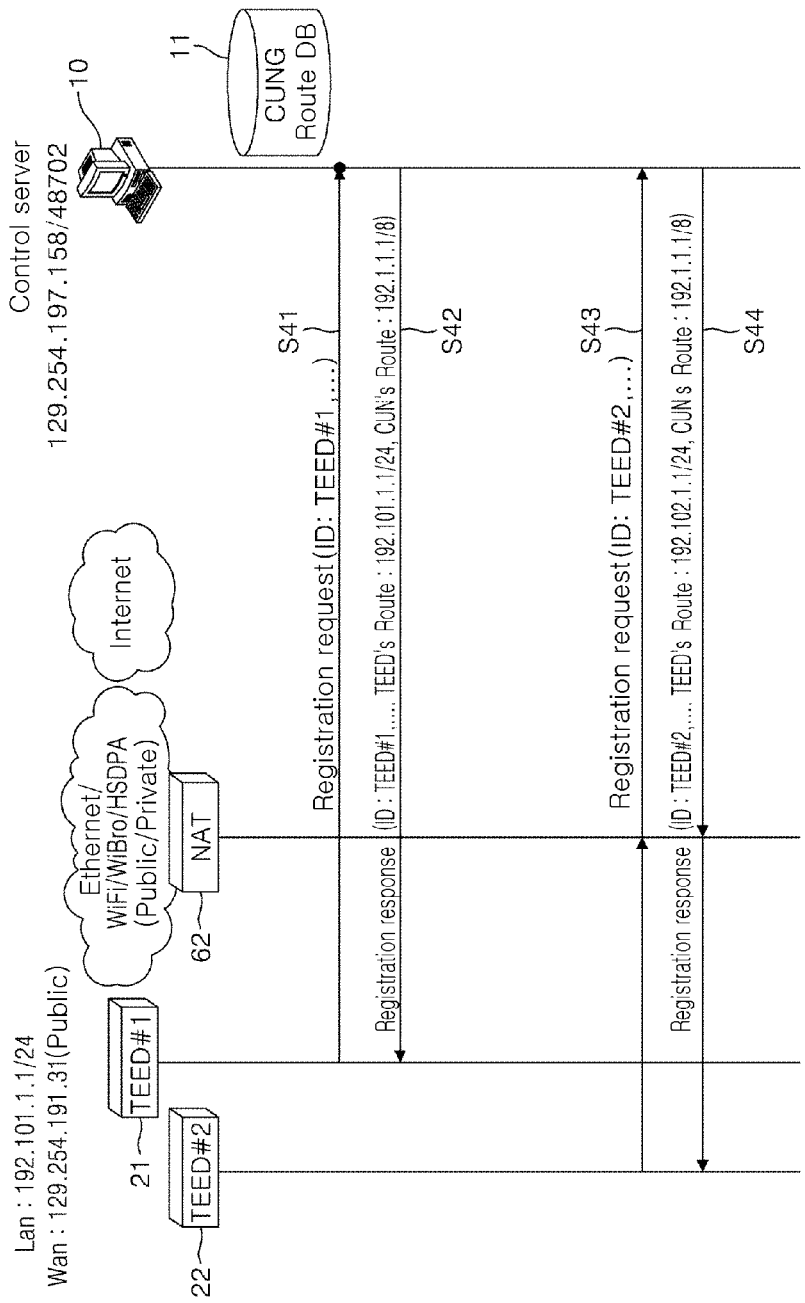
FIG. 4 illustrates the process of performing registration by the TEED of the CUN to a control server.

FIG. 4 illustrates the process of performing registration by the TEED of the CUN to the control server. Here, the control server 10 includes a CUNG route database 11 to be allocated to each TEED. The CUNG route database may be allocated to each TEED according to a subscription procedure, may be provisioned, or may be allocated according to an automatically calculated algorithm. In the present exemplary embodiment, it is assumed that a table shown in Table 2 below is stored in the CUNG route database 11.

TABLE 2

| TEED ID | ROUTE INFORMATION TO BE ALLOCATED | OTHERS |
|---|---|---|
| TEED #1 | 192.101.1.1/24 | ... |
| TEED #2 | 192.102.1.1/24 | ... |

First, when the TEED #1 21 requests registration to the control server 10 (S41), the control server 10 allocates the closed IP section information of 192.101.1.1/24, a corresponding closed IP section, to the TEED #1 21 with reference to the CUNG route database 11 provided therein (S42).

Thereafter, when the TEED #2 22 requests registration to the control server 10 (S43), the control server 10 allocates the closed IP section information of 192.102.1.1/24, a corresponding closed IP section, to the TEED #2 22 with reference to the CUNG route database 11 provided therein (S44).

In this case, the control server 10 reflects the closed IP section information allocated to each TEED on a tunnel and forwarding table to be established afterward, so as to use it as information in determining to which TEED an input packet should be forwarded.

The TEED #1 21 and TEED #2 22 use the closed IP section information allocated from the control server 10 as an IP pool to be allocated to each terminal connected to each of them later.

In addition, the control server 10 provides the closed IP section information, i.e., 192.1.1.1/8 information, of every CUN managed by the control server 10 to the TEED #1 21 and TEED #2 22. Based on this information, the TEED #1 21 and TEED #2 22 can determine whether a packet received from a terminal should be forwarded to the CUN or to the existing Internet. In other words, if a destination IP address corresponds to a route of the CUN, the control server 10 forwards the received packet to the CUN through tunneling, or otherwise, the control server 10 forwards the received packet to the existing Internet according to its destination, rather than tunneling it.

Figure 5:
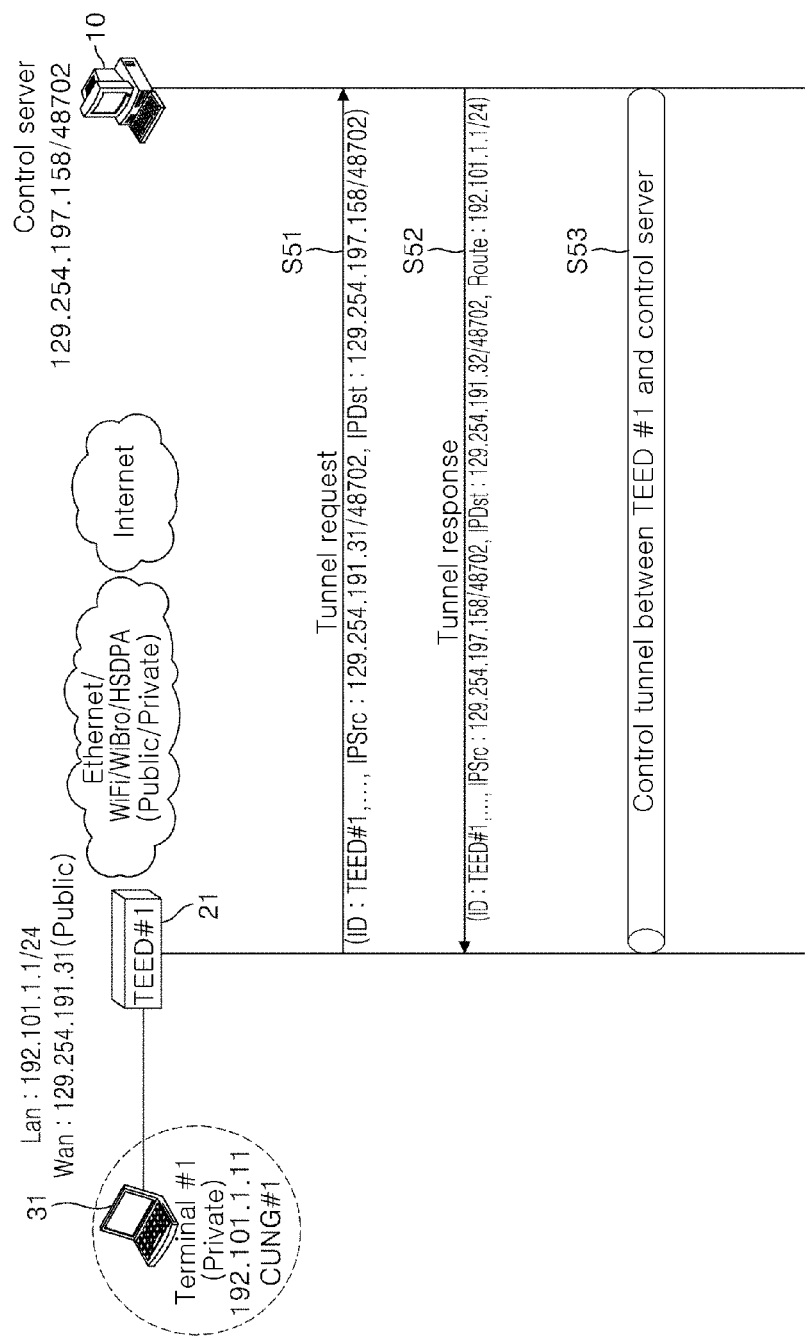
FIG. 5 illustrates the process of establishing a control tunnel between a TEED connected to a public network and the control server.

FIG. 5 illustrates the process of establishing a control tunnel between the TEED connected to a public network and the control server. To establish a control tunnel, the TEED #1 21 must be allocated closed IP section information from the control server 10 and receive all the closed IP section information of the CUN. In addition, the TEED #1 21 and the control sever 10 must have the NAT traversal function.

It is assumed that an IP address of the control server 10 is 129.254.197.158 and a UDP port to be used for tunneling is 48702. In addition, it is assumed that an IP address in a WAN direction of the TEED #1 21 is 129.254.191.31 and a UDP port to be used for tunneling is 48702. In this network environment, a tunneling process is performed between the TEED #1 21 and the control server 10 according to the following procedure.

First, the TEED #1 21 finishes a procedure for registration with the control server 10 and then transmits a tunnel request message to the control server 10.

Upon receiving the tunnel request message, the control server 10 establishes a tunnel, connects the route information allocated to the TEED #1 21 to the established tunnel, and then transmits a tunnel response message to the TEED #1 21 (S52). Here, the route information is used to determine whether to forward a packet, which has been received from a different TEED, to the TEED #1 21.

Upon receiving the tunnel response message, the TEED #1 21 establishes a tunnel with the control server 10 (S53) and then connects the closed IP section information (192.1.1.1/8) of every CUN, which has been received from the control server 10, to the established tunnel. Here, the closed IP section information of every CUN is used to determine whether the TEED #1 21 should forward a packet, which has been received from the terminal, to the CUN through tunneling or to the existing Internet.

And then, the TEED #1 21 may allocate an IP address to the terminal connected to the TEED #1 21 within the address of 192.101,1.xxx/24.

Table 3 and Table 4 below show the tunnel establishment results, each showing the structure of tunnel table of the control server and that of the TEED #1.

TABLE 3

| | Source | | Destination | |
|---|---|---|---|---|
| ROUTE | IP address | UDP port | IP address | IDP port |
| 192.101.1.1/24 | 129.254.197.158 | 48702 | 129.254.191.31 | 48702 |

TABLE 4

| | Source | | Destination | |
|---|---|---|---|---|
| ROUTE | IP address | UDP port | IP address | IDP port |
| 192.101.1.1/8 | 129.254.197.158 | 48702 | 129.254.197.158 | 48702 |

Figure 6:
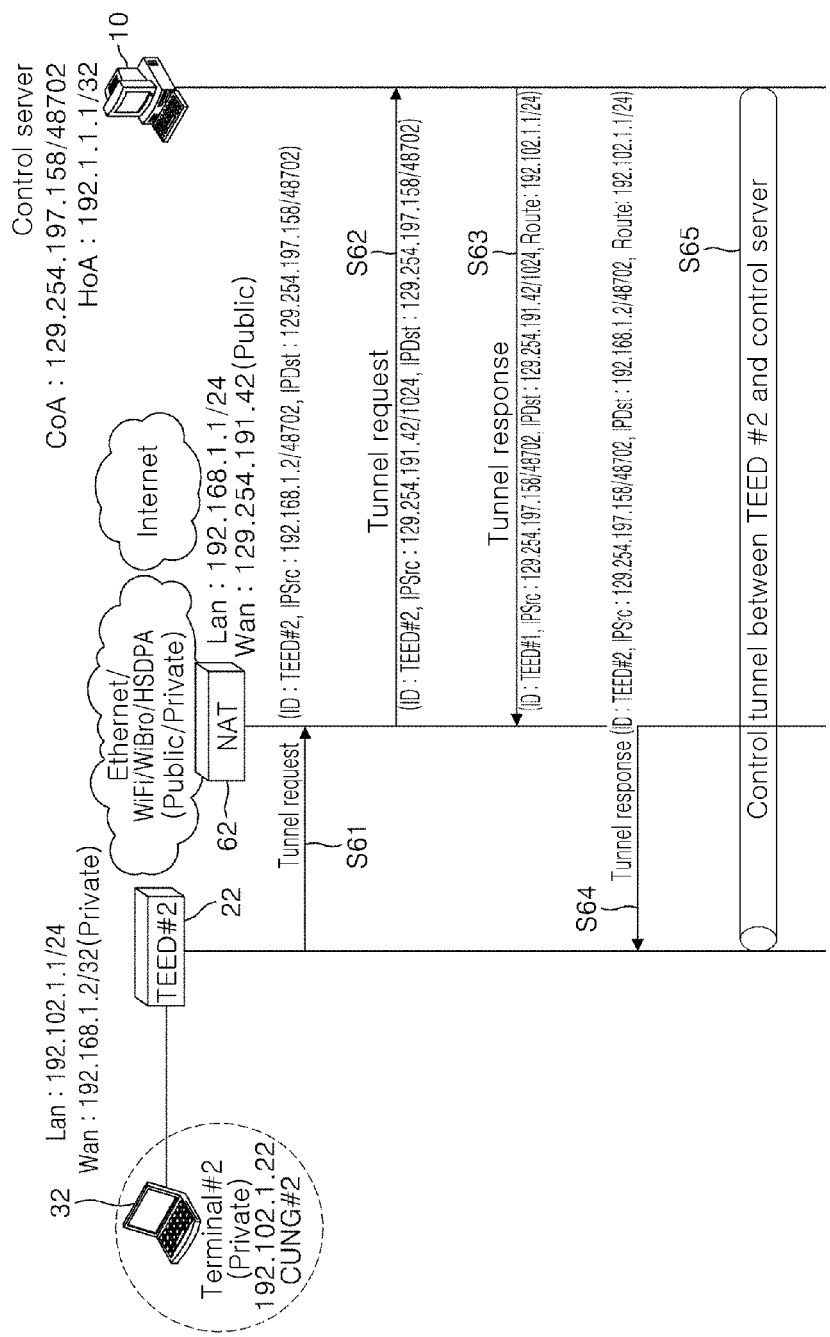
FIG. 6 illustrates the process of establishing a control tunnel between a TEED connected to a private network and the control server.

FIG. 6 illustrates the process of establishing a control tunnel between a TEED connected to a private network and the control server.

It is assumed that an IP address of the control server 10 is 129.254.197.158 and a UDP port to be used for tunneling is 48702. Also, it is assumed that an IP address in a WAN direction of the TEED #2 22 is 192.168.1.2 and a UDP port to be used for tunneling is 48702. Also, it is assumed that an IP address in the WAN direction of the NAT 62 is 129.254.191.42 and an IP address in a private LAN direction of the NAT 62 is 192.168.1.1/24. In this network environment, a tunneling procedure between the TEED #2 22 and the control server 10 is performed according to the following procedure.

First, the TEED #2 22 finishes registration procedure with the control server 10 and transmits a tunnel request message to the control server 10 via the NAT 62 (S61, S62). In this case, as a transmitted packet passes through the NAT 62, a source IP address (Src IP) and a UDP port are changed to 129.254.191.42 and 1024.

Thereafter, the control server 10 checks the changed source IP address and the UDP port of the received tunnel request message and reflects them on tunnel information to be set. In other words, in the tunnel information to be set for the TEED #2 22, a destination IP and a UPT port are 129.254.191.42 and 1024, the IP address and port, which have been changed when passed through the NAT 62.

Upon receiving the tunnel request message, the control server 10 establishes a tunnel, connects route information, which has been allocated to the TEED #2 22, to the established tunnel, and transmits a tunnel response message to the TEED #2 22 (S63, S64). Also, in this case, the control server uses the changed IP address and port, and the tunnel response message is restored to the original IP address and port while passing through the NAT 62 so as to be transferred to the TEED #2 22.

When the TEED #2 receives the tunnel response message, a control tunnel is established between the TEED #2 22 and the control server 10 (S65), and the TEED #2 22 connects the closed IP section information (192.1.1.1/8) of every CUN provided from the control server 10 to the established tunnel.

Thereafter, the TEED #2 22 may allocate an IP address to the terminals connected to the TEED #2 22 within an address 192.102.1.xxx/24.

Table 5 and Table 6 below show the tunnel establishment results, each showing the structure of tunnel table of the control server and that of the TEED #2.

TABLE 5

| Route | Source | | Destination | |
|---|---|---|---|---|
| | IP address | UDP port | IP address | IDP port |
| 192.101.1.1/24 | 129.254.197.158 | 48702 | 129.254.191.42 | 1024 |

TABLE 6

| Route | Source | | Destination | |
|---|---|---|---|---|
| | IP address | UDP port | IP address | IDP port |
| 192.101.1.1/8 | 129.168.1.2 | 48702 | 129.254.197.158 | 48702 |

Table 7 below shows the possibility (or availability) of direct communications between terminals according to each connection type in the CUN, including the control server, the TEED and the terminal, according to an exemplary embodiment of the present invention. With reference to Table 7, it is noted that the use of the tunneling function between the TEED having the NAT traversal function and the control server as shown in FIG. 5 allows for direct communications between terminals in any event in spite of the use of a closed IP, namely, a private IP.

TABLE 7

| | | Ethernet | | WiFi | | WiBro Public | HSDPA Private | Server farm Public |
|---|---|---|---|---|---|---|---|---|
| | | Public | Private | Public | Private | | | |
| Ethernet | Public | ○ | ○ | ○ | ○ | ○ | ○ | ○ |
| | Private | ○ | ○ | ○ | ○ | ○ | ○ | ○ |
| WiFi | Public | ○ | ○ | ○ | ○ | ○ | ○ | ○ |
| | Private | ○ | ○ | ○ | ○ | ○ | ○ | ○ |
| WiBro | Public | ○ | ○ | ○ | ○ | ○ | ○ | ○ |
| HSDPA | Private | ○ | ○ | ○ | ○ | ○ | ○ | ○ |
| Server farm | Public | ○ | ○ | ○ | ○ | ○ | ○ | ○ |

Figure 7:
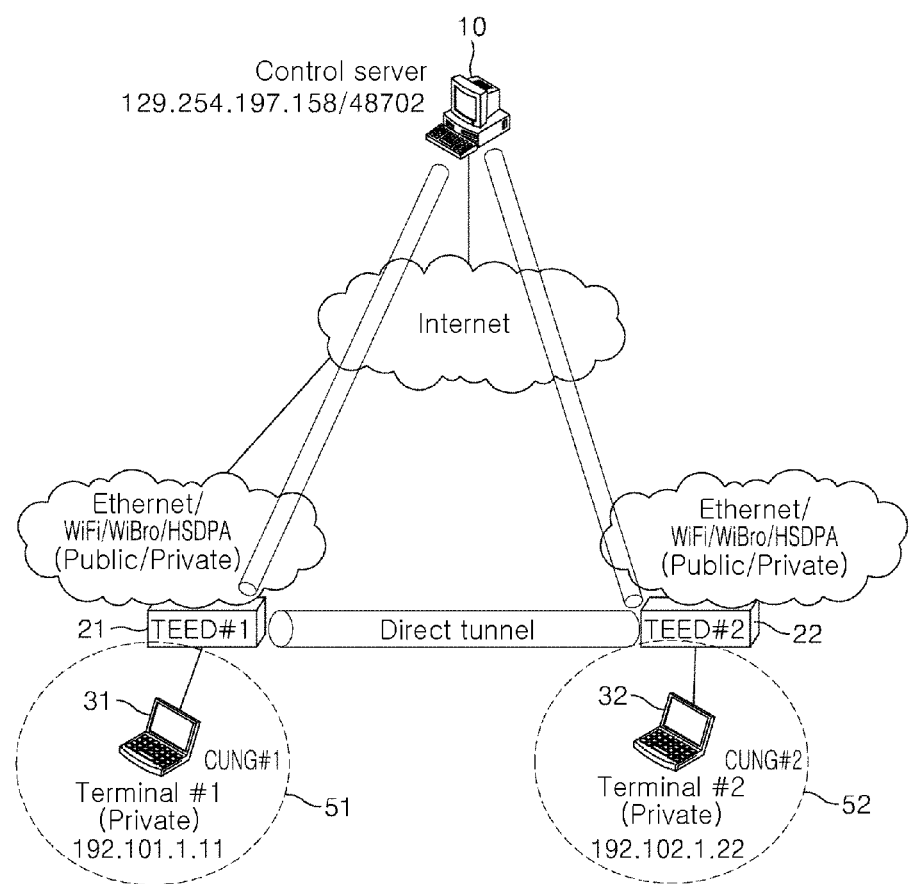
FIG. 7 illustrates a direct tunnel establishment structure between TEEDs.

FIG. 7 illustrates a direct tunnel establishment structure between TEEDs, in which a direct tunnel may be established between TEEDs to route data traffic around the control server to thus reduce the control server's data forwarding burden. In other words, when a direct tunnel is established between the TEEDs, data traffic for the communications between the terminals connected to the CUNG #1 51 of the TEED #1 21 and the CUNG #2 52 of the TEED #2 22 can be forwarded through the established direct tunnel, so the burden of data forwarded to the control server 10 can be minimized.

Figure 8:
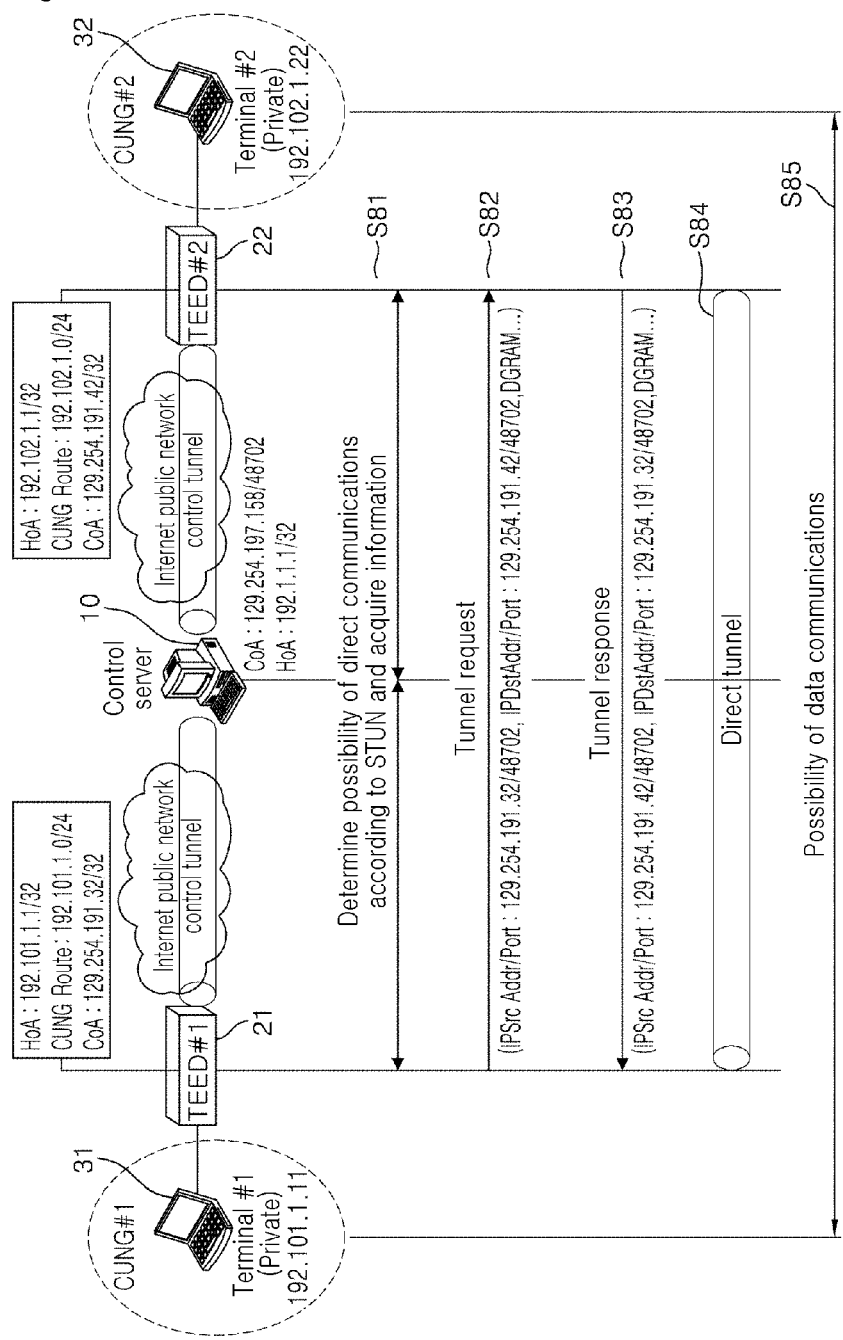
FIG. 8 illustrates the process of establishing a direct tunnel between the TEEDs.

FIG. 8 illustrates the process of establishing a direct tunnel between the TEEDs, in which the terminal #1 31 and the terminal #2 32 located respectively in the CUNG #1 and the CUNG #2 generated by the TEED #1 21 and the TEED #2 22 can communicate through a control channel.

In order to establish a direct tunnel between the TEED #1 21 and the TEED #2 22, whether or not the TEED #1 21 and the TEED #2 22 are located within NAT or firewall should be taken into consideration.

If both the TEED #1 21 and the TEED #2 22 are connected to a public network without a firewall, an IP address and a port number of the TEED #1 21 and the TEED #2 22 may be set by the user or information of the counterpart TEED may be obtained through the control server 10 to thereby perform a tunneling process.

However, in other cases, direct communications between the TEED #1 21 and the TEED #2 22 are not possible. In order to make direct communications possible, the respective TEEDs must exchange a message with a counterpart TEED by using an allocated IP address and port number, learn a changed IP address and port number of the counterpart TEED through message exchanging, and use the learned IP address and port number as tunnel establishment information. The method of checking the IP address and port number changing in the NAT environment and checking whether or not there is firewall may be referred to a STUN document.

FIG. 8 shows the process of establishing the direct tunnel between the TEED #1 21 and the TEED #2 22 when the TEED #1 21 and the TEED #2 22 are both connected to a public network.

First, the TEED #1 21 and the TEED #2 22 determine a network access type according to the STUN method to check a direct communications availability. If direct communications are possible, the TEED #1 21 acquires information about an IP address and port number to be used for communications with the TEED #2 22 (S81). Meanwhile, if direct communications between the TEED #1 21 and the TEED #2 22 are not possible (for example, if the TEED #1 21 and the TEED #2 22 are both connected to a symmetric NAT), they perform communications by using an established control tunnel, rather than by performing direct tunneling.

Thereafter, the TEED #1 21 and the TEED #2 22 perform a tunneling process by using the acquired IP address and port number. In this case, the TEED #1 21 and the TEED #2 22 must have information about an established tunnel to the control server 10.

In detail, when the TEED #1 21 exchanges tunnel request and tunnel response messages with the TEED #2 22, tunnel information and route information (192.101.1.1/24) to the TEED #1 21 are set in the TEED #2 22 and tunnel information and route information (192.102.1.1/24) to the TEED #1 21 are set in the TEED #1 21. The route information is subnet information used in the CUNG generated by each TEED, which can be directly acquired from the control server 10 or from the counterpart TEED during a tunneling process.

When a direct tunnel is established between the TEED #1 21 and the TEED #2 22 according to the process as described above, the terminal #1 31 and the terminal #2 32 can directly communicate through the established direct tunnel.

Figure 9:
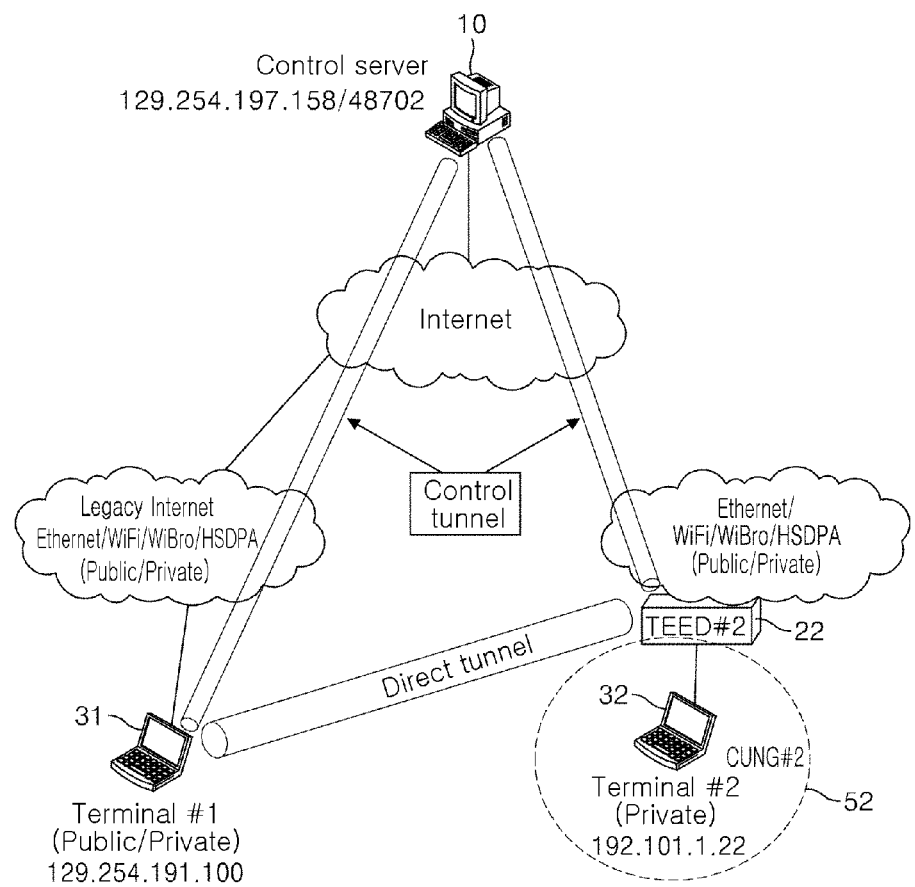
FIG. 9 illustrates a tunnel structure for a terminal located outside a CUNG to communicate with a terminal located within the CUNG.

FIG. 9 illustrates a tunnel structure for a terminal located outside CUNG to communicate with a terminal located within CUNG.

The CUN interrupts a packet from general Internet terminals basically at an IP layer. Thus, when the terminal #1 31 is not located within the CUN and connects to a general network, it includes and operates client software allowing for tunneling to communicate with a terminal located within the CUN.

There are two methods for the terminal #1 31 to communicate with the terminal #2 32 located within the CUN: a first one is a method in which the terminal #1 31 establishes a control tunnel to the control server 10 in order to connect to the CUNG #2 52 by way of the control server 10; and a second one is a method in which the terminal #1 31 establishes a control tunnel to the TEED #2 22 which has generated the CUNG #2 52 with which the terminal #1 31 wants to communicate, and connects to the CUNG #2 52 without going through the control server 10.

Figure 10:
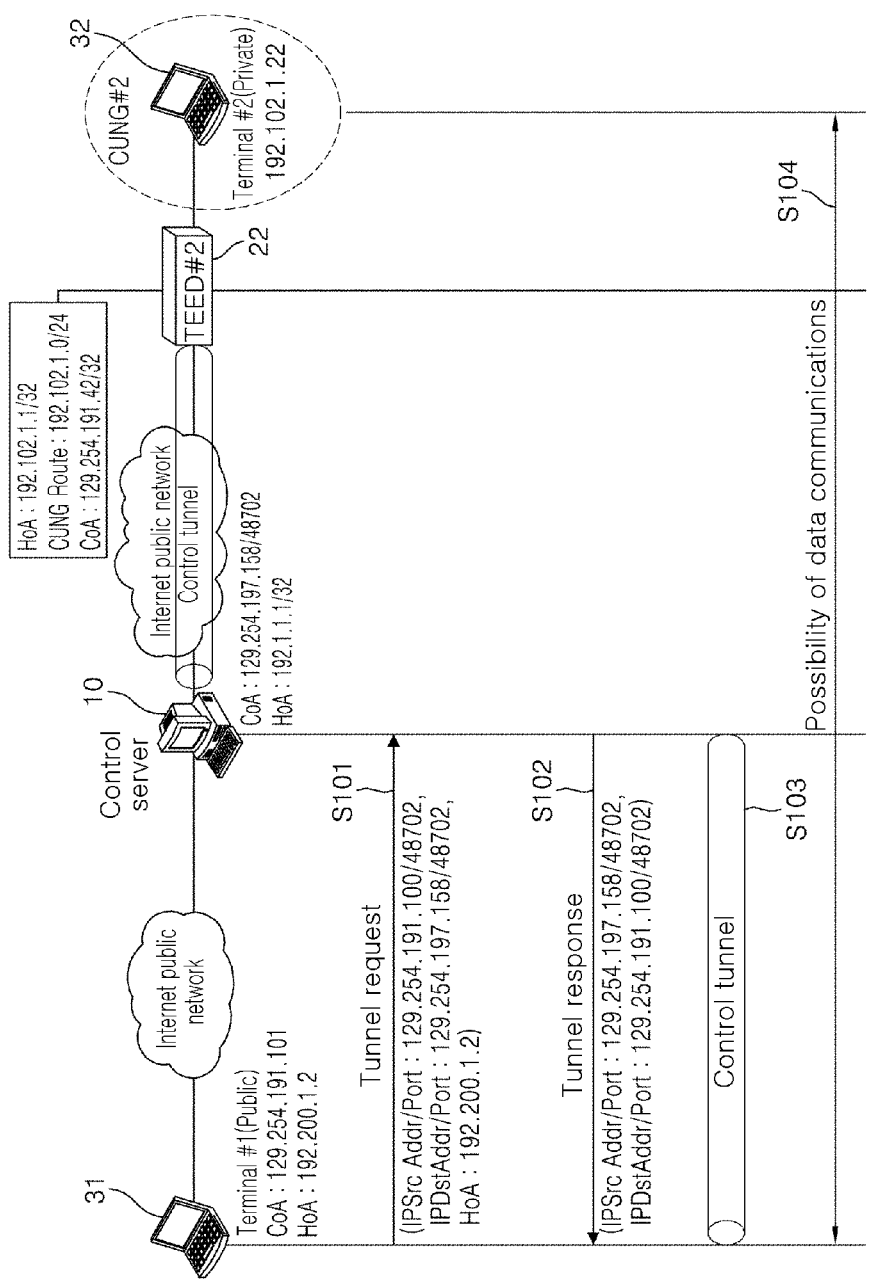
FIG. 10 illustrates the process of establishing a control tunnel for the terminal located outside the CUNG to communicate with the terminal located within the CUNG.

FIG. 10 illustrates the process of establishing a control tunnel for the terminal located outside the CUNG to communicate with the terminal located within the CUNG. Here, the TEED #2 22 has already generated the CUNG #2 through registration and tunneling to the control server 10, and information regarding tunnel and route to the CUNG #2 has been set in the control server 10.

The terminal #1 31 performs tunneling with the control sever 10 by using an IP address (CoA) which has been allocated from the connected general network and an IP address (HoA) which has been allocated from the control server 10. In this case, the CoA is used as tunneling and tunnel information, and the HoA is used as information about a route connected to the tunnel.

First, when the terminal #1 31 transmits a tunnel request message to the control server 10 (S101), the control server 10 configures information about a tunnel and route to the terminal #1 31 and transmits a tunnel response message to the terminal #1 31 (S102).

Thereafter, the terminal #1 31 establishes a control tunnel to the control server 10 and connects the CUN route information, which has been allocated from the control server 10, to the tunnel to thereby connect to the CUN (S103). In this case, once the tunnel to the control server 10 is established, the terminal #1 31 can communicate with every terminal connected to the CUNG #2, as well as with the CUNG #2 (S104).

Figure 11:
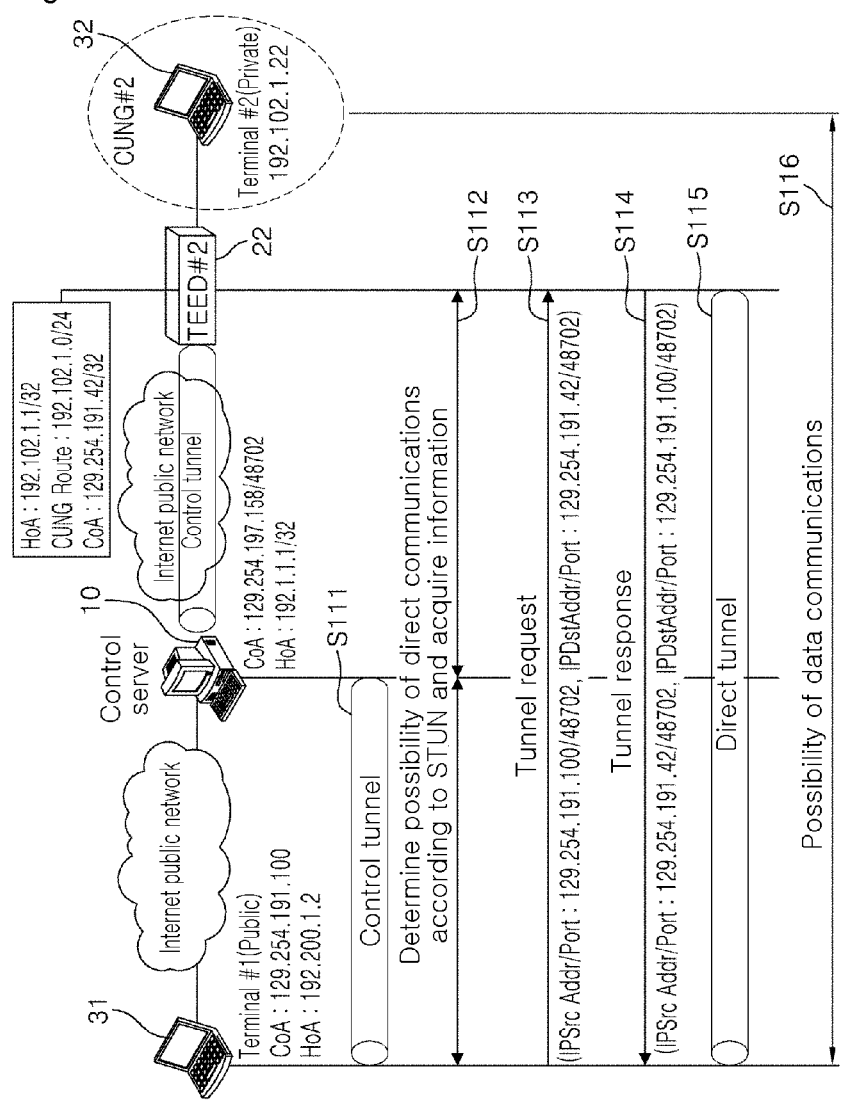
FIG. 11 illustrates the process of establishing a direct tunnel for the terminal located outside the CUNG to communicate with the terminal located within the CUNG.

FIG. 11 illustrates the process of establishing a direct tunnel for the terminal located outside the CUNG to communicate with the terminal located within the CUNG. In detail, the terminal #1 31 located outside the CUNG #2 establishes a direct tunnel with the TEED #2 22 in order to communicate with the terminal #2 32 within the CUNG #2. Here, the terminal #1 31 and the terminal #2 32 located within the CUNG #2 which has been generated by the TEED #2 22 are in a communications-available state.

In order for the terminal #1 31 to establish a direct tunnel with the TEED #2 22, whether or not the TEED #2 22 is located within a NAT or firewall should be considered.

If the TEED #2 22 is in a state of being connected to a public network without firewall, the user may set an IP address and port number of the TEED #2 22 or information can be obtained through the control server 10 to perform the tunneling process.

However, in other cases, direct communications for tunneling between the terminal #1 31 and the TEED #2 22 are not possible. In this case, because a message exchange for tunneling to the TEED #2 22 is made by using an IP which has been allocated from a network, not by using a closed IP, a method for the terminal #1 31 and the TEED #2 22 to exchange tunneling messages by using an address allocated from a network is required.

First, the terminal #1 31, the control server 10, and the TEED #2 22 determine whether direct communications are possible by checking a network access type of the terminal #1 31 and the TEED #2 22 according to the STUN method. If direct communications are possible, the terminal #1 31 acquires information regarding an IP address and port number to be used for communications with the TEED #2 22 (S112). Meanwhile, if direct communications between the terminal #1 31 and the TEED #2 22 are not possible (for example, the terminal #1 31 and the TEED #2 22 are all connected to a symmetric NAT), the terminal #1 31 and the TEED #2 22 do not perform direct tunneling but perform communications by using a previously established control tunnel.

Thereafter, the terminal #1 31 and the TEED #2 22 perform a tunneling process by using the acquired IP address and port number. In this case, the terminal #1 31 and the TEED #2 22 must have information regarding an established tunnel to the control server 10.

In detail, when the terminal #1 31 exchanges tunnel request and tunnel response messages with the TEED #2 22, information regarding the tunnel and route to the terminal #1 31 are set in the TEED #2 22 and information regarding the tunnel and route to the TEED #2 22 are set in the terminal #1 31 (S113, S114). The information regarding the route for connecting the terminal #1 31 to the tunnel to the TEED #2 22 is route information of the CUNG #2 which has been generated by the TEED #2 22, which can be directly acquired from the control server 10 or from the TEED #2 22 during the tunneling process.

When the direct tunnel is established between the terminal #1 31 and the TEED #2 22 according to the process as described above (S115), the terminal #1 31 can directly communicate with every terminal located within the CUNG #2 through the direct tunnel.

Figure 12:
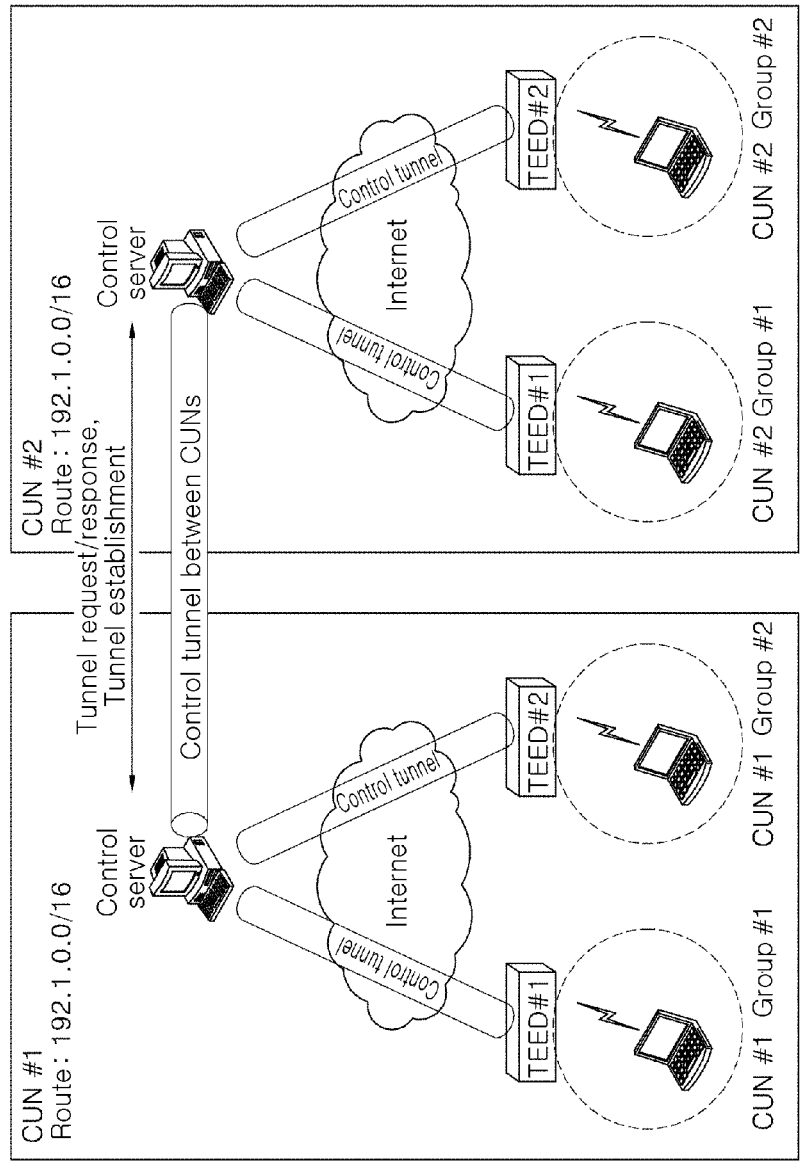
FIG. 12 illustrates a tunnel structure for interworking between CUNs.

FIG. 12 illustrates a tunnel structure for interworking between CUNs.

As shown in FIG. 12, a single control server forms a single CUN, and several CUNs may exist. For example, if a head office has several branch offices, the head office and the branch offices may form a CUN, respectively, and a control server of each branch office may establish a control tunnel with a control server of the head office between CUNs. A closed IP section (192.1.0.0/16, 192.2.0.0/16) to be used in each CUN is allocated to each CUN, and a closed IP section (192.0.0.0/8) including the closed IP section to be used in every CUN is allocated to a terminal located outside the TEED and the CUN, whereby a terminal connected to a group #1 of the CUN #1 can communicate with a terminal located in a group #2 of the CUN #2 through the control tunnel between the CUNs.

In this manner, because each control server is constantly located in the public network, the control tunnel between the CUNs may be manually established or may be established by exchanging tunnel request/response messages. In addition, in connecting the CUNs, a representative CUN may be designated and a plurality of CUNs may establish a tunnel to the representative CUN or each tunnel may be established in a mesh form between CUNs.

While the present invention has been shown and described in connection with the exemplary embodiments, it will be apparent to those skilled in the art that modifications and variations can be made without departing from the spirit and scope of the invention as defined by the appended claims.

The invention claimed is:

1. A closed user network (CUN) system comprising:
   a control server configured to establish a control tunnel with a tunnel endpoint edge device (TEED) and forward a packet transmitted and received to and from the TEED by using closed IP section information which has been allocated to the TEED; and
   a user terminal configured via execution of client software for performing tunneling with the control server to establish a direct tunnel with the control server when the user terminal is not connected to the TEED to enable the user terminal to be allocated a closed IP from the control server to communicate with terminals connected with the TEED;
   the TEED configured to establish the control tunnel with the control server and allocate the closed IP to the user terminal when the user terminal is connected to the TEED, within a closed IP section allocated from the control server.

2. The system of claim 1, wherein the TEED has a network address translation (NAT) function, and performs tunneling on a packet within the allocated closed IP section, and does not perform tunneling a packet outside the allocated closed IP section but forwards the packet through the NAT function.

3. The system of claim 1, wherein the user terminal establishes the direct tunnel with the TEED and performs communications with the terminals connected with the TEED through the direct tunnel.

4. A tunnel endpoint edge device (TEED) that establishes a control tunnel with a control server to allocate a closed IP to a terminal when the terminal is connected to the TEED, within a closed IP section allocated from the control sever, the TEED having a network address translation (NAT) function,
   wherein the TEED performs tunneling on a packet within the allocated closed IP section, and does not perform tunneling on a packet outside the allocated closed IP section but forwards the packet through the NAT function, and
   wherein the terminal, when not connected to the TEED is configured via execution of client software for performing tunneling with the control server to establish a direct tunnel with the control server to enable the terminal to be allocated the closed IP from the control server to communicate with other terminals connected with the TEED via the direct tunnel.

5. A method for configuring a closed user network (CUN), the method comprising:
   establishing a control tunnel between a tunnel endpoint edge device (TEED) and a control server;
   allocating, by the TEED, a closed IP to a terminal that is connected to the TEED within a closed IP section allocated from the control server;
   determining, by the TEED, whether to forward a packet which has been received from the terminal to the CUN or to a general network; and
   responsive to the terminal not being connected to the TEED, enabling the terminal to execute client software to directly tunnel to the control server for allocation of the closed IP from the control server to communicate with other terminals connected with the TEED.

6. The method of claim 5, further comprising: before the control tunnel is established, transmitting, by the TEED, a registration request message to the control server; and receiving, by the TEED, the closed IP section as allocated from the control server.

7. The method of claim 6, further comprising: receiving, by the TEED, closed IP section information of all CUNs managed by the control server from the control server, before the control tunnel is established.

8. The method of claim 7, wherein the determining of whether to forward the packet which has been received from the terminal, by the TEED, to the CUN or to the general network is made based on the closed IP section information of all the CUNs.

9. The method of claim 5, wherein the establishing of the control tunnel comprises: establishing, by the control server, the control tunnel according to a tunnel request message received from the TEED and connecting the closed IP section information, which has been allocated to the TEED, to the established control tunnel; and establishing, by the TEED, the control tunnel according to a tunnel response message which has been received from the control server, and connecting the closed IP section information of all CUNs to the established control tunnel.

10. The method of claim 5, wherein the establishing of the control tunnel comprises: establishing, by the control server, the control tunnel, by reflecting changed source IP address and UDP port information of a tunnel request message received from the TEED and connecting the closed IP section information, which has been allocated to the TEED, to the established control tunnel; and establishing, by the TEED, the control tunnel according to the tunnel response message received from the control server, and connecting the closed IP section information of all CUNs to the established control tunnel.

11. The method of claim 5, further comprising: establishing a direct tunnel between the TEED and a second TEED previously registered to the control server.

12. The method of claim 11, wherein the establishing of the direct tunnel comprises: determining whether or not direct communications between the TEED and the second TEED are available by checking a network access type of the TEED and that of the second TEED according to a STUN method; if direct communications are available, acquiring, by the TEED, an IP address and a port number to be used for communications with the second TEED; exchanging a tunnel request message and a tunnel response message between the TEED and the second TEED; and setting tunnel information and route information in the TEED and the second TEED.

13. The method of claim 5, further comprising: establishing a direct tunnel between the TEED and a user terminal which has not been connected to the TEED.

14. The method of claim 13, wherein the establishing of the direct tunnel comprises: determining whether or not direct communications between the TEED and the user terminal are available by checking a network access type of the TEED and that of the user terminal according to a STUN method; if direct communications are available, acquiring, by the user terminal, an IP address and a port number to be used for communications with the TEED; exchanging a tunnel request message and a tunnel response message between the TEED and the user terminal; and setting tunnel information and route information in the TEED and the user terminal.

* * * * *